United States Patent
Sacco et al.

(10) Patent No.: US 11,281,564 B2
(45) Date of Patent: Mar. 22, 2022

(54) METHOD AND SYSTEM FOR GENERATING KEY PERFORMANCE INDICATORS (KPIS) FOR SOFTWARE BASED ON DEBUGGING INFORMATION

(71) Applicant: HCL Technologies Italy S.p.A., Vimodrone (IT)

(72) Inventors: Andrea Sacco, Rome (IT); Stefano Sidoti, Rome (IT)

(73) Assignee: HCL Technologies Italy S.p.A., Milan (IT)

( * ) Notice: Subject to any disclaimer, the term of this patent is extended or adjusted under 35 U.S.C. 154(b) by 87 days.

(21) Appl. No.: 16/907,462

(22) Filed: Jun. 22, 2020

(65) Prior Publication Data

US 2021/0397540 A1    Dec. 23, 2021

(51) Int. Cl.
*G06F 9/48* (2006.01)
*G06F 11/00* (2006.01)
(Continued)

(52) U.S. Cl.
CPC ...... *G06F 11/3636* (2013.01); *G06F 11/3466* (2013.01); *G06F 11/366* (2013.01);
(Continued)

(58) Field of Classification Search
CPC ............ G06F 11/3636; G06F 11/3466; G06F 11/366; G06F 16/137; G06F 16/3344;
(Continued)

(56) References Cited

U.S. PATENT DOCUMENTS

| 7,716,253 B2 | 5/2010 | Netz et al. |
| 9,294,361 B1 | 3/2016 | Choudhary et al. |

(Continued)

FOREIGN PATENT DOCUMENTS

| AU | 2012202261 B2 | 1/2015 |
| EP | 3590228 A1 | 1/2020 |

(Continued)

OTHER PUBLICATIONS

Saraswati Jituri et al., A Methodology to Satisfy Key Performance Indicators for Successful ERP Implementation in Small and Medium Enterprises, 2018, [Retrieved on Oct. 22, 2021], Retrieved from the internet: <URL: http://www.ijimt.org/vol9/792-MA020.pdf> 6 Pages (79-84) (Year: 2018).*

(Continued)

*Primary Examiner* — Anibal Rivera
(74) *Attorney, Agent, or Firm* — Kendal Sheets

(57) ABSTRACT

A method and system for generating Key Performance Indicators (KPIs) for a software based on debugging information is disclosed. In some embodiments, the method includes creating a mapping of each of a plurality of lines in a log of the software to at least one issue Identifier (ID) from a set of issue IDs. The method further includes generating a mapping database consisting of the logs along with their predicted issued ID based on the aforementioned mapping. The method further includes identifying, for each of the set of issue IDs, a set of mapped sentences based on a set of mapped lines. The method further includes generating, for each of the set of issue IDs, a KPI based on the associated set of mapped sentences and the associated set of mapped lines.

17 Claims, 8 Drawing Sheets

(51) Int. Cl.
*G06F 11/36* (2006.01)
*G06F 11/34* (2006.01)
*G06N 20/00* (2019.01)
*G06F 16/13* (2019.01)
*G06F 16/33* (2019.01)
*G06K 9/62* (2022.01)
*G06F 16/17* (2019.01)
*G06F 9/38* (2018.01)
*G06F 9/451* (2018.01)
*G06F 16/951* (2019.01)

(52) U.S. Cl.
CPC ........ *G06F 16/137* (2019.01); *G06F 16/1734* (2019.01); *G06F 16/3344* (2019.01); *G06K 9/6257* (2013.01); *G06N 20/00* (2019.01); *G06F 9/3891* (2013.01); *G06F 9/451* (2018.02); *G06F 16/951* (2019.01)

(58) Field of Classification Search
CPC .. G06F 16/1734; G06F 16/951; G06F 9/3891; G06F 9/451; G06N 20/00; G06K 9/6257
See application file for complete search history.

(56) References Cited

U.S. PATENT DOCUMENTS

| | | | |
|---|---|---|---|
| 10,558,554 B2* | 2/2020 | Bhandarkar | G06N 20/00 |
| 2009/0064025 A1* | 3/2009 | Christ | G06Q 10/087 |
| | | | 715/772 |
| 2016/0105330 A1 | 4/2016 | Choudhary et al. | |
| 2019/0147363 A1 | 5/2019 | Maheshwari et al. | |
| 2020/0104775 A1 | 4/2020 | Chintalapati et al. | |
| 2021/0117232 A1* | 4/2021 | Sriharsha | G06F 9/3891 |
| 2021/0117868 A1* | 4/2021 | Sriharsha | G06F 17/18 |

FOREIGN PATENT DOCUMENTS

| | | |
|---|---|---|
| WO | 2017172541 A1 | 10/2017 |
| WO | 2019149712 A1 | 8/2019 |

OTHER PUBLICATIONS

Abigail Collins, Using Machine Learning to Create New KPIs.
Marcus Thorström, Applying machine learning to key performance indicators.

* cited by examiner

| Log Hash ID 408 | Issue ID 410 |
|---|---|
| 1132:949:9321 | 57 |
| 9390:23:2310 | 94 |
| 3231:8727:0396 | 32 |

Identify, for each of the issue IDs, a set of mapped sentences based on a set of mapped lines 308

Identify, for each of the issues, a pluarlity of lines. 502

Compute a correlation percentage, for each of the plurality of lines, with respect to the issue ID, based on the number of lines mapped to the issue IDs 504

Select the set of mapped lines for the issue ID from the plurality of lines 506

Determine, for each of the set of mapped lines, a correlation frequency of each of the associated sentences with the issue ID 508

Select the set of mapped sentences from the associated sentences in each of the set of mapped lines 510

FIG. 5

Determine, for each of the set of mapped lines, a correlation frequency of each of the associated sentences with the issue ID 508

Extract sentences from the mapped line 602

Determine a percentage contribution of each of the sentences for mapping the mapped line to the issue ID, based on the number of sentences in the mapped line and frequency of occurrence each of the sentences in a remaining plurality of lines not mapped to the issued ID 604

Identify at least one sentence from the sentences 606

FIG. 6

METHOD AND SYSTEM FOR GENERATING KEY PERFORMANCE INDICATORS (KPIS) FOR SOFTWARE BASED ON DEBUGGING INFORMATION

TECHNICAL FIELD

Generally, the invention relates to generating Key Performance Indicators (KPIs) for software. More specifically, the invention relates to method and system for generating KPIs for software based on debugging information.

BACKGROUND

Presently, almost all software products are embedded with logging capabilities and a variety of logging levels in order to help administrators to monitor software product's environment. Also, the logging capabilities provide facility to the administrator to diagnose issues in software products, when found while monitoring software product's environment. A manufacturer company may provide a degree of support to customers during the lifetime of a software product. In order to provide support to the customers, the manufacturer company may communicate with the customers and may record feedback received from the customers. A byproduct of relationship between the manufacturer company and the customers may be a database. The database may include issues encountered in software products, data provided by the customers, and solution provided by the manufacturer company. Usually, a part of data provided by the customers while reporting issue, that may be required by the manufacturer company may include excerpts of software logs that may or may not include relevant information about the issue. In addition, the customers that are interested in monitoring environment of their software product may often examine the logging data.

Moreover, it is particularly important for the manufacturer company to track success of the software product in order to attract a new segment of customers. Currently, the success of the software products is facilitated using Key Performance Indicators (KPIs). The KPIs are most common parameters that are used for measuring performance or health of a software product. The KPIs allow product managers or the manufacture company to evaluate engagement, feature usage, user experience, and, of course, commercial success of the software product. Conventionally, KPIs are created by developers or analyst at time of producing the software product. In addition, an identification of KPIs may be based on unspecific steps and best practices. However, the conventional method may be time consuming, expensive, difficult, and may require extra efforts. Additionally, sometimes even the developers or the analyst may end up missing some important factors that may be required for monitoring performance and health of the software product while developing KPIs.

There is therefore, a need for a method and system that may automatically generate KPIs for a software product.

SUMMARY OF INVENTION

In one embodiment, a method of generating Key Performance Indicators (KPIs) for a software based on debugging information is disclosed. The method may include creating, by a Machine Learning (ML) model, a mapping of each of a plurality of lines in a log of the software to at least one issue Identifier (ID) from a set of issue IDs. It should be noted that, each of the plurality of lines comprises at least one sentence and the ML model is trained based on a log database comprising a plurality of training logs mapped to at least one of the set of issue IDs. The method may include generating, by the ML model, a mapping database for the log based on the mapping. It should be noted that, the mapping database comprises a hash ID for each of the plurality of lines mapped to the associated at least one issue ID. The hash ID for each line in the plurality of lines comprises hash values of the associated at least one sentence. The method may include identifying, for each of the set of issue IDs, a set of mapped sentences based on a set of mapped lines. It should be noted that, the set of mapped lines is selected from the plurality of lines based on the mapping database. The method may include generating, for each of the set of issue IDs, a KPI based on the associated set of mapped sentences and the associated set of mapped lines.

In another embodiment, a system for generating KPIs for a software based on debugging information is disclosed. The system may include a processor and a memory communicatively coupled to the processor. The memory may store processor-executable instructions, which, on execution, may causes the processor to create, by a ML model, a mapping of each of a plurality of lines in a log of the software to at least one issue ID from a set of issue IDs. It should be noted that, each of the plurality of lines comprises at least one sentence. The ML model is trained based on a log database comprising a plurality of training logs mapped to at least one of the set of issue IDs. The processor-executable instructions, on execution, may further cause the processor to generate, by the ML model, a mapping database for the log based on the mapping. It should be noted that, the mapping database comprises a hash ID for each of the plurality of lines mapped to the associated at least one issue ID. The hash ID for each line in the plurality of lines comprises hash values of the associated at least one sentence. The processor-executable instructions, on execution, may further cause the processor to identify, for each of the set of issue IDs, a set of mapped sentences based on a set of mapped lines. It should be noted that, the set of mapped lines is selected from the plurality of lines based on the mapping database. The processor-executable instructions, on execution, may further cause the processor to generate, for each of the set of issue IDs, a KPI based on the associated set of mapped sentences and the associated set of mapped lines.

In yet another embodiment, a non-transitory computer-readable medium storing computer-executable instruction for generating Key Performance Indicators (KPIs) for a software based on debugging information is disclosed. The stored instructions, when executed by a processor, may cause the processor to perform operations including creating, by a Machine Learning (ML) model, a mapping of each of a plurality of lines in a log of the software to at least one issue Identifier (ID) from a set of issue IDs. It should be noted that, each of the plurality of lines comprises at least one sentence. The ML model is trained based on a log database comprising a plurality of training logs mapped to at least one of the set of issue IDs. The operations may further include generating, by the ML model, a mapping database for the log based on the mapping. It should be noted that, the mapping database comprises a hash ID for each of the plurality of lines mapped to the associated at least one issue ID. The hash ID for each line in the plurality of lines comprises hash values of the associated at least one sentence. The operations may further include identifying, for each of the set of issue IDs, a set of mapped sentences based on a set of mapped lines. It should be noted that, the set of mapped lines is selected from the plurality of lines based on the mapping database. The operations may further include generating, for each of the set of issue IDs, a KPI based on the associated set of mapped sentences and the associated set of mapped lines.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals

FIG. 5 is a flowchart of a method for identifying a set of mapped sentences based on a set of mapped lines for each of a set of issue IDs, in accordance with an embodiment.

FIG. 6 is a flowchart of a method of determining correlation frequency of each associated sentence with an issue ID, in accordance with an embodiment.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hardwired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
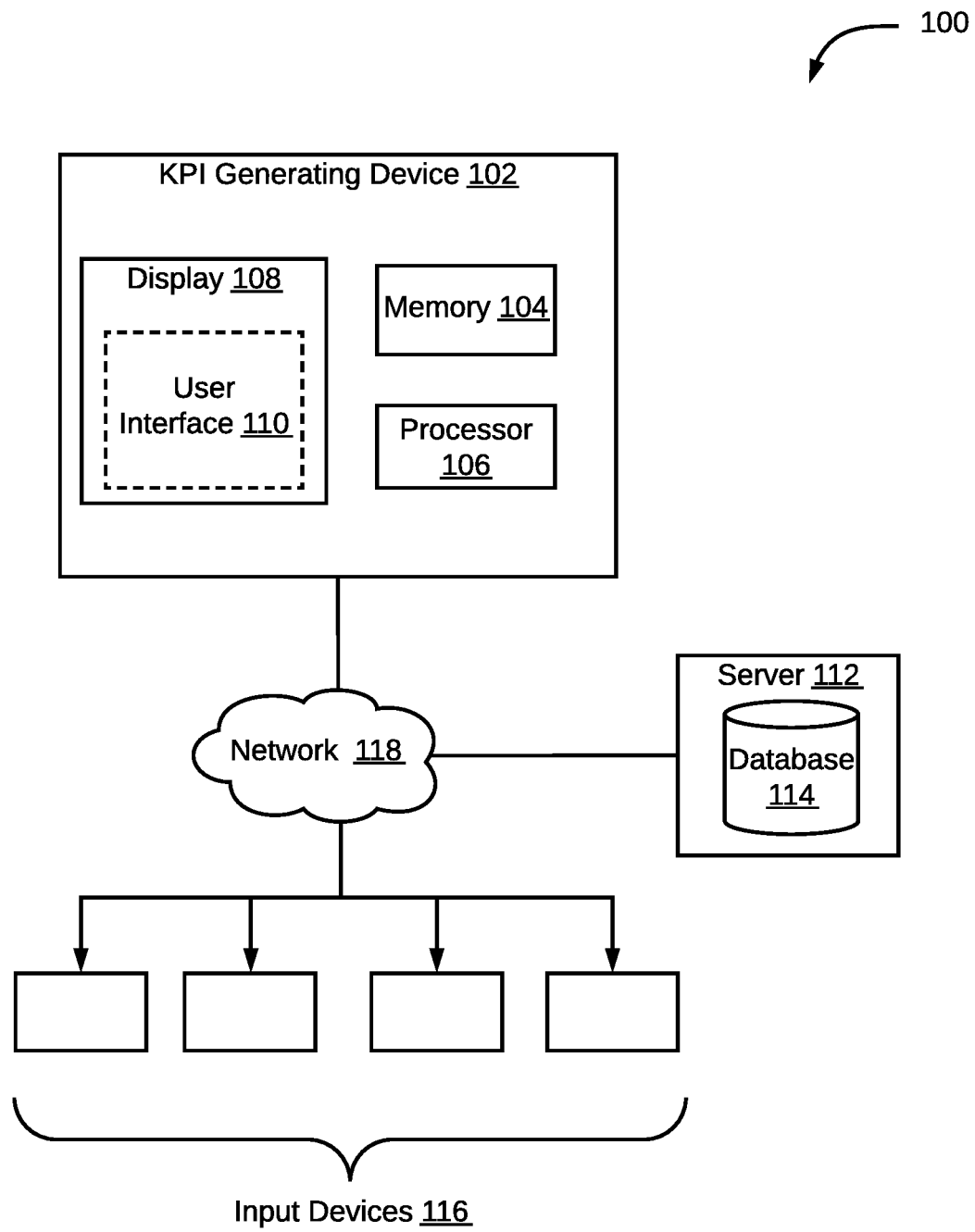
FIG. 1 is a block diagram illustrating a system for generating Key Performance Indicators (KPIs) for a software based on debugging information, in accordance with an embodiment.

Referring now to FIG. 1, a block diagram of an exemplary system 100 for generating Key Performance Indicators (KPIs) for a software, based on debugging information is illustrated, in accordance with an embodiment. The system 100 may include a KPI generation device 102 that automatically generates a KPI for a software. The KPI generation device 102 may generate the KPI corresponding to the software based on an associated set of mapped sentences and an associated set of mapped lines. In an embodiment, the KPI generation device 102 may generate the KPI based on data collected by a support staff of the software provider and/or real-time data received as a log of the software. It should be noted that the KPI may be generated with an aid of Machine Learning (ML) algorithms in order to monitor health of the software in various customer environments.

In particular, the KPI generation device 102 may create a mapping of each of a plurality of lines and sentences contained therein of a software log to one or more issue Identifiers (IDs) from a set of issue IDs. Each set of issue IDs is further mapped to an issue. By way of an example, an issue ID 57 may be mapped to the issue "Cannot Download File." Thereafter, based on the mapping, the KPI generation device 102 may generate a mapping database. The mapping database may include a hash ID of each of the plurality of lines, which is further mapped to one or more issue IDs. Further, for a given issue ID, the KPI generation device 102 may identify a set of mapped sentences based on a set of mapped lines that are mapped to that issue ID in the mapping database. The KPI generation device 102 may then generate a KPI for each issue ID based on the associated set of mapped sentences and the associated set of mapped lines. Thus, by automatically generating KPIs for the software based on the debugging information, the system 100 may resolve problems in the conventional methods and systems. This is further explained in detail in conjunction with FIG. 2 to FIG. 8.

Examples of the KPI generation device 102 may include, but are not limited to, a server, a desktop, a laptop, a notebook, a tablet, a smartphone, a mobile phone, an application server, or the like. The KPI generation device 102 may include a memory 104, a processor 106, and a display 108. The display 108 may further include a user interface 110. A user or an administrator may interact with the KPI generation device 102 and vice versa through the display 108.

By way of an example, the display 108 may be used to display results of analysis performed by the KPI generation device 102, to the user. By way of another example, the user interface 110 may be used by the user to provide inputs to the KPI generation device 102. Thus, for example, in some embodiments, the KPI generation device 102 may ingest the log corresponding to the software and one or more selected data provided by a product manager/administrator via the user interface 110. Further, for example, in some embodiments, the KPI generation device 102 may render intermediate results (e.g., a correlation percentage corresponding to the set of mapped lines) or final results (e.g., the KPI generated corresponding to the software) to the product manager/administrator via the user interface 110. In some embodiments, the product manager/administrator may provide inputs to the KPI generation device 102 via the user interface 110.

The memory 104 may store instructions that, when executed by the processor 106, may cause the processor 106 to generate KPI for the software based on debugging information, in accordance with some embodiments. As will be described in greater detail in conjunction with FIG. 2 to FIG. 8, in order to generate KPI for the software, the processor 106 in conjunction with the memory 104 may perform various functions including creating the mapping, generating a mapping database, training of the ML model, creating the log database, and prediction of the issue ID.

The memory 104 may also store various data (e.g. data collected by the support, real-time data received corresponding to the software, the set of issue IDs, the mapping database, the log database, training and testing data for the ML model etc.) that may be captured, processed, and/or required by the KPI generation device 102. The memory 104 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.)

Further, the KPI generation device 102 may interact with a server 112 or input devices 116 over a network 118 for sending and receiving various data. The input devices 116 may include, but may not be limited to a desktop, a laptop, a notebook, a netbook, a tablet, a smartphone, a remote server, a mobile phone, or another computing system/device. The network 118, for example, may be any wired or wireless communication network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

In some embodiments, the KPI generation device 102 may receive the data collected by the support of the manufacturer company from the server 112. The server 112 may be configured to extract the plurality of training logs along with an associated set of issue IDs corresponding to the software product. The server 112 may further include a database 114, which may store information related to the plurality of training logs and the set of issues IDs corresponding to the software on the server 112. Alternatively, the KPI generation device 102 may receive the log corresponding to the software from one of the input devices 116.

Figure 2:
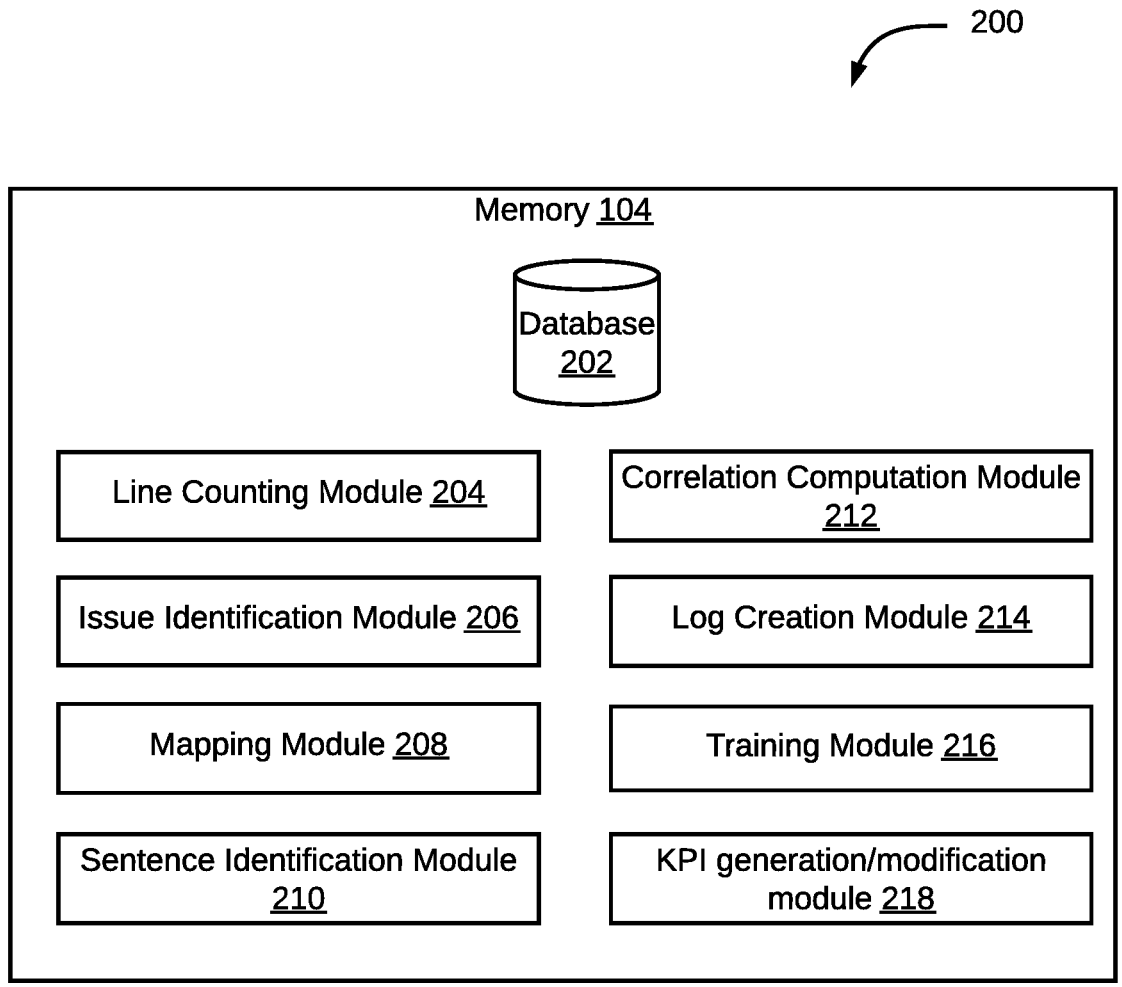
FIG. 2 is a functional block diagram of various modules within a memory of a KPI generation device configured to generate KPIs for a software based on debugging information, in accordance with an embodiment.

Referring now to FIG. 2, a block diagram of various modules within the memory 104 of the KPI generation device 102 configured to generate KPIs for a software based on debugging information is illustrated, in accordance with an embodiment. Initially, a log of a software is received from one of the input devices 116 by the memory 104. Additionally, data collected by the support from the server 112 may be provided to the memory 104. In order to generate one or more KPIs for the software, the memory 104 may include a database 202, a line counting module 204, an issue identification module 206, a mapping module 208, a sentence identification module 210, a correlation computation module 212, a log creation module 214, a training module 216, and a KPI generation/modification module 218. Thus, the log received and the data collected by the support may be used as an input to the KPI generation device 102, which may then provide the KPI corresponding to the software as an output to the product manager/administrator via the user interface 110 over the display 108.

The database 202 may be a log database, which may include a plurality of training logs mapped to at least one of the set of issue IDs. It should be noted that the log database may be created based on the data collected by the support of the manufacturer company over years for a current software. The data collected may thus include concerning issues corresponding to the current. In addition, the database 202 may be configured to store the log of the software for which KPIs are required to be generated. Based on the database 202, the system 200 may create the mapping of the plurality of lines in the log of the software to at least one issue ID from the set of issue IDs. Moreover, the database 202 may be updated periodically with the KPIs generated for the software.

The line counting module 204 may be configured to identify and determine the plurality of lines in the log of the software. Each of the plurality of lines in the log may further include one or more sentences. By way of an example, each of the plurality of lines in the log and the at least one sentence may be represented by equations 1 and 2 give below:

$$L_i = \{l_1, l_2, \ldots, l_n\} \qquad (1)$$

$$l_j = \{s_1, s_2, \ldots, s_m\} \qquad (2)$$

where,
l represents lines,
s represents sentences,
i has a value from 1 to n, and
j has a value from 1 to m.

Further, each sentence in the plurality of lines may be a natural language sentence that maps to a portion of a software code for the software. In an embodiment, each sentence may represent a set of steps in the software code, which may trigger logging.

The issue identification module 206 may be configured to create mapping of the each of the plurality of lines in the log to at least one issue ID from the set of issue IDs. Each of the set of issue IDs may correspond to an issue. In an embodiment, the issue may correspond to a problem reported in existing software in past years. In other words, the issue may represent indexed definition of the problem corresponding to the existing software that may be contained in an appropriate dictionary.

The mapping module 208 may be configured to generate a mapping database based on the mapping and the log. The mapping database may include mapping of each of the plurality of lines of the log of the software to one or more issue IDs. The mapping database may include a hash ID for each of the plurality of lines mapped to the associated at least one issue ID. In addition, since each line may include one or more sentences, the hash ID for each line in the plurality of lines may include hash values of these one or more sentences. The hash ID for a line may be a concatenation of hash values of the one or more sentences. The hash value for each sentence may be generated by using a predefined hashing function.

The sentence identification module 210 may be configured to receive the mapping database from the mapping module 208. The sentence identification module 210 may then identify the set of mapped sentences for an issue ID, based on a set of lines mapped to the issue ID in the mapping database. The set of lines may be selected from the plurality of lines based on the mapping database. For example, a line may be "Connection to server has expired. Please, re-authenticate" and the hash ID of the line is mapped to an issue ID 57. In this example, the line includes two different sentences i.e., "Connection to server has expired." and "Please, re-authenticate." The sentence identification module 210 may thus identify that these two sentences in this example are mapped to the issue ID 57.

The correlation computation module 212 may be configured to determine a correlation percentage corresponding to each of the plurality of lines of the log based on the number of mapped issue IDs. Once the correlation percentage is generated, the mapping module 208 may select the set of mapped lines from the plurality of lines based on the correlation percentage. In an embodiment, for a given issue ID, the set of mapped lines selected may be those lines for which the correlation percentage is above a predefined correlation threshold. In addition, the correlation computation module 212 may be configured to determine a correlation frequency for each of the associated sentences with the issue ID in the set of mapped lines. Once the correlation frequency is determined for a given issue ID, the sentence identification module 210 may select a set of mapped sentences from the associated sentences. The set of mapped sentences may be selected, such that, the correlation frequency of the set of mapped sentences may be greater than a predefined frequency threshold. It will be apparent to a person skilled in the art that for ease of explanation reference has been made to a single log for explaining various embodiment, however, various embodiments of the invention may be implement for multiple logs of the software in a similar manner as described above for a single log. Especially, correlation may be performed across multiple logs of the software.

The log creation module 214 may be configured to create the log of the software, which may include the plurality of lines. The plurality of lines may include one or more sentences as discussed above. In another embodiment, the log creation module 214 may also create the set of training logs in order to train the ML model. The set of training logs may include a set of training lines and each of the set of training lines may further include one or more training sentences mapped to at least one portion of a software code. In other words, for the training logs, training lines and the training sentences are already mapped to one or more of the set of issue IDs. Thus, this mapping is further used for training the ML model.

The training module 216 may be configured to train the ML model based on the set of training logs. In an embodiment, the ML model may be trained to predict an issue ID (or a class of problem) for each of the plurality of lines and one or more sentences therein in the log. An output generated by training of the ML model may correspond to a function that may map on a number of lines, i.e., {l1, l2, . . . , ln} of the log to one or more issue IDs. Thereafter, based on training of the ML model, the KPI generation/modification module 218 may generate one or more KPIs corresponding to the software. In an embodiment, a KPI may be generated for each of the set of issue IDs based on the associated set of mapped sentences and the associated set of mapped lines. In another embodiment, the KPI generation/modification module 218 may modify existing KPIs based on new requirements of the software.

It should be noted that the KPI generation device 102 may be implemented in programmable hardware devices such as programmable gate arrays, programmable array logic, programmable logic devices, or the like. Alternatively, the KPI generation device 102 may be implemented in software for execution by various types of processors. An identified engine/module of executable code may, for instance, include one or more physical or logical blocks of computer instructions which may, for instance, be organized as an object, module, procedure, function, or other construct. Nevertheless, the executables of an identified engine/module need not be physically located together but may include disparate instructions stored in different locations which, when joined logically together, comprise the identified engine/module and achieve the stated purpose of the identified engine/module. Indeed, an engine or a module of executable code may be a single instruction, or many instructions, and may even be distributed over several different code segments, among different applications, and across several memory devices.

As will be appreciated by one skilled in the art, a variety of processes may be employed for generating KPIs for the software based on debugging information. For example, the exemplary system 100 and associated KPI generation device 102 may manage the generation of the KPI, by the process discussed herein. In particular, as will be appreciated by those of ordinary skill in the art, control logic and/or automated routines for performing the techniques and steps described herein may be implemented by the system 100 and the associated KPI generation device 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all the processes described herein may be included in the one or more processors on the system 100.

Figure 3:
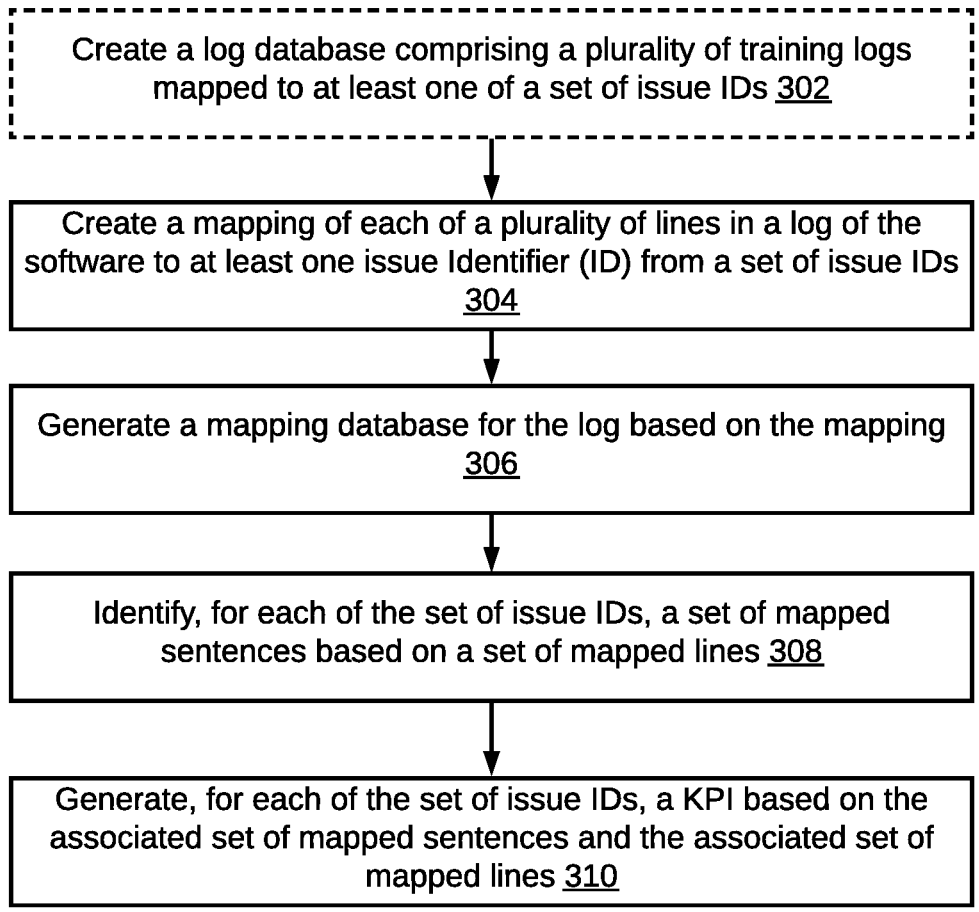
FIG. 3 is a flowchart of a method for generating KPIs for a software based on debugging information, in accordance with an embodiment.

Referring now to FIG. 3, a flowchart of a method for generating KPIs for a software based on debugging information is depicted, in accordance with an embodiment. In an embodiment, each step of the method may be executed by the KPI generation device 102. At step 302, a log database may be created. The log database may include a plurality of training logs mapped to one or more of a set of issue IDs. In an embodiment, the log database may be generated based on the data collected by the support of the manufacturer company in past years. Each of the plurality of training logs may include a set of training lines. Each of the set of training lines may further include one or more training sentences mapped to at least one portion of a software code for the software. In an embodiment, each of the set of issue IDs may be mapped to an issue, which may correspond to a problem usually encountered by the software.

It may be noted that for ease of explanation, reference has been made to a single log of the software for explaining various embodiment, however, as will be apparent to a person skilled in the art, various embodiments of the invention may be implement for multiple logs of the software in a similar manner as described below for the single log. At step 304, a mapping may be created for each of a plurality of lines in a log (debugging information) of the software to one or more issue IDs from the set of issue IDs. It should be noted that, the mapping may be created using an ML model (for example, the training module 216 that includes the ML algorithm). In an embodiment, each of the plurality of lines may include one or more sentences. In order to create the mapping, the ML model may be trained based on the log database described in the step 302. At step 306, a mapping database may be generated by the ML model for the log based on the mapping created at step 304. In other words, the mapping database may be generated based on aforementioned mapping described in step 304. In addition, the mapping database generated consist of the logs along with their predicted issued ID. The mapping database may include a hash ID for each of the plurality of lines mapped to the associated at least one issue ID. The hash ID for each line in the plurality of lines may include hash values of the associated one or more sentences. In an embodiment, the hash ID for each line in the plurality of lines may be a concatenation of hash values of the associated one or more sentences. The hash values may be generated based on a predefined hashing function. In other words, for a given line, a hash ID of the line may be mapped to an issue ID in the mapping database. The hash ID for the give line includes hash values of the sentences in the given line. The hash ID may be a concatenation of hash values of these sentences. This is further explained in conjunction with the exemplary embodiment of FIGS. 4A and 4B.

At step 308, a set of mapped sentences may be identified for each of the set of issue IDs, based on a set of mapped lines. The set of mapped lines may be selected from the plurality of lines based on the mapping database. In other words, for a given issue ID, a set of sentences may be identified based on the set of mapped lines that are mapped to the issue ID in the mapping database. In an embodiment, each sentence in the plurality of lines may map to a portion of a software code for the software. Additionally, each set of sentences may be in natural language.

At step 310, a KPI may be generated for each of the set of issue IDs based on the associated set of mapped sentences and the associated set of mapped lines. In other words, for a given issue ID a KPI may be generated based on the set of mapped sentences and the set of mapped lines that are mapped to the given issue ID. This is further explained in conjunction with FIG. 5 and FIG. 6.

Figures 4A, 4B:
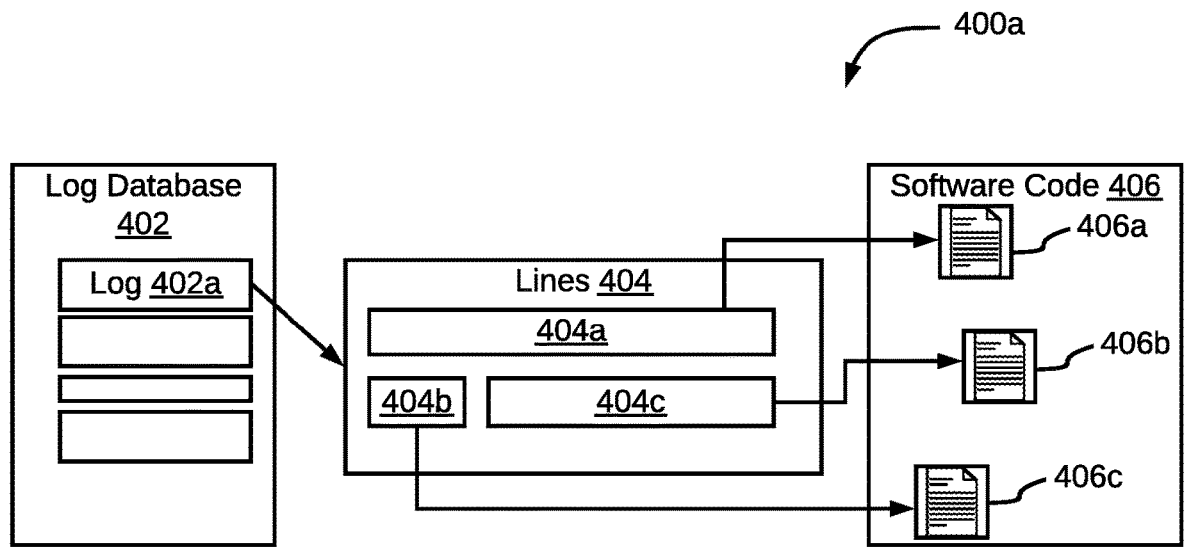
FIG. 4A illustrates mapping of a plurality of lines in a log of a software to one or more portions of a software code, in accordance with an exemplary embodiment.
FIG. 4B illustrates a table depicting a database generated based on mapping of lines of a log in a software to an issue Identifier (ID), in accordance with an exemplary embodiment.

Referring now to FIG. 4A, a block diagram 400a depicting mapping of a plurality of lines in a log of a software to one or more portions of a software code is illustrated, in accordance with an exemplary embodiment. The block diagram 400a may include a log database 402, which may include a plurality of logs. Each of the plurality of logs in the log database 402 may include a plurality of lines. Each of the plurality of lines may further include one or more sentences. By way of an example, a log and the plurality of lines included therein may be represented as depicted by equations 3, 4, and 5:

$$l_1 = \{s_{11}, \ldots s_{1a}\} \quad (3)$$

$$l_2 = \{s_{21}, \ldots s_{2b}\} \quad (4)$$

$$\ldots$$

$$l_n = \{s_{n1}, \ldots, s_{nc}\} \quad (5)$$

where, 'l' represents lines and 's' represents sentences.

For illustrative purpose, in this exemplary embodiment, reference is made to a log 402a, which includes a plurality of lines 404, i.e., lines 404a, 404b, and 404c. Each of the plurality of lines 404 may further include one or more sentences (not shown in FIG. 4A). In an embodiment, each sentence in the plurality of lines 404 may be a natural language sentence and may further map to a portion of a software code 406 for the software. By way of an example, a sentence in the line 404a may map to a portion 406a of the software code 406, a sentence in the line 404b may map to a portion 406b of the software code 406, and a sentence in the line 404c may map to a portion 406c of the software code 406.

Referring now to FIG. 4B, a mapping database 400b generated based on mapping of the plurality of lines 404 in the log 402a to one or more issue IDs is illustrated, in accordance with an exemplary embodiment. The mapping database 400b may be generated by an ML model, based on mapping of each of the plurality of lines 404 to one or more issue IDs from the set of issue IDs. The mapping database 400b may include the hash ID for each of the lines 404a, 404b, and 404c, each of which are further mapped to an issue ID. The hash ID for each of the plurality of lines 404 may include hash values of one or more sentences included therein. In the mapping database 400b, hash ID for each of the plurality of lines 404 may be represented in a log hash ID column 408. Additionally, in the mapping database 400b, issue IDs mapped to each of the plurality of lines 404 may be represented in an issue ID column 410. In the mapping database 400b, the hash ID for the line 404a may be represented as "1132:949:9321," the hash ID for the line 404b may be represented as "9390:23:2310," and the hash ID for the line 404c may be represented as "3231:8727: 0396." Each of hash IDs in the log hash ID column 408 may be the concatenation of hash values of the associated one or more sentences. By way of an example, for the hash ID "1132:949:9321," the hash value "1132" corresponds to a first sentence in the line 404a, the hash value "949" corresponds to a second sentence in the line 404a, and the hash value "9321" corresponds to a third sentence in the line 404a.

Referring now to FIG. 5, a flowchart of a method for identifying a set of mapped sentences based on a set of mapped lines for each of a set of issue IDs is illustrated, in accordance with an embodiment. Referring back to step 308, for each of the issue IDs, a set of mapped sentences may be identified based on the set of mapped lines. The set of mapped lines may be selected from the plurality of lines based on a mapping database. In other words, for a given issue ID, a set of mapped sentences are identified based on the set of mapped sentences that are mapped to the issue ID in the mapping database (for example, the mapping database 400b).

In order to identify a set of mapped sentences for an issue ID, steps 502 to 508 may be performed. At step 502, a plurality of lines may be identified for each of the issue ID. Based on number of lines mapped to the issue ID identified at step 502, for the issue ID, a correlation percentage may be computed for each of the plurality of lines with respect to the issue ID, at step 504. This may be repeated for each issue ID in the set of issue IDs. In an embodiment, the value of this correlation percentage may vary from 0 to 100.

Once the correlation percentage for each of the plurality of lines with respect to the issue ID is computed, a set of mapped lines may be selected for the issue ID from the plurality of lines at step 506. The set of mapped lines may be selected, such that, the correlation percentage for each of the set of mapped lines may be greater than a predefined correlation threshold. By way of an example, the predefined correlation threshold may be set at 80. Thus, each of the plurality of lines that have a correlation percentage above 80% with respect to the issue ID, may be selected as the set of mapped lines. At step 508, a correlation frequency with the issue ID may be determined for each of the associated sentences in each of the set of mapped lines. In other words, a mapped line may be taken and for each sentence in the mapped line, a correlation frequency with the issue ID may be determined. This may be repeated for each line in the set of mapped lines. Thereafter, at step 510, the set of mapped sentences may be selected from the set of mapped lines. The set of mapped sentences may be selected, such that, the correlation frequency of each of the set of mapped sentences is greater than a predefined frequency threshold. This is further explained in detail in conjunction with FIG. 6 and FIG. 7.

Referring now to FIG. 6, a flowchart of method of determining correlation frequency of a sentence with an issue ID is illustrated, in accordance with an embodiment. Referring back to step 508, a correlation frequency with the issue ID may be determined for each associated sentence in each of a set of mapped lines that are mapped to the issue ID in a mapping database (for example, the mapping database 400*b*). The step 508 further includes steps 602 to 606, which are performed for a mapped line that is mapped to the issue ID. The steps 602 to 606 may be performed for each mapped line in the set of mapped lines that are mapped to the issue ID.

In order to determine a correlation frequency for sentences within the mapped line for the issue ID, the sentences may be extracted from the mapped line at step 602. In an embodiment, different hash values in the hash ID representation of the mapped line may be used to extract the sentences. At step 604, the percentage contribution of each of the sentences for mapping the mapped line to the issue ID may be determined. In an embodiment, the percentage contribution of a sentence for mapping to the issue ID may be determined based on the total number of sentences in the mapped line and frequency of occurrence of each of these sentences in a remaining plurality of lines that are not mapped to the issued ID in the mapping database.

By way of a non-limiting example, there may be four lines in the log. The first line may be mapped to an issue ID 1 and may further include two sentences, i.e., A and B. Thereafter, it is determined whether any of the remaining three lines (mapped to different issue IDs) include the sentence B. It may be established that the fourth line also includes the sentence B or a similar sentence having same hash value. In similar sentences, all relevant detail are the same, while non-relevant details may be different. By way of an example, a first sentence may be "Error 403: The server is refusing to authorize request #4021." A second sentence that is similar to the first sentence may be: "Error 403: The server is refusing to authorize request #931." In the first and second sentences, the non-relevant details are the request numbers, i.e., #4021 and #931. For such similar sentences, the hash value generated by the same hash function may be the same. Thus, the initial percentage contribution of the sentence B for mapping the first line to the issue ID 1 may be determined as 50%. The initial percentage contribution may further be adjusted based on the total number of sentences in the first line. Since, the first line includes two sentences, i.e., A and B, an adjusted percentage contribution of the sentence B may be determined as half of the initial percentage contribution, i.e., 25%. Thus, percentage contribution of the sentence B towards mapping of the first line to the "issue ID 1" is 25%. In this example, we have assumed that the sentence A is only present in the first line. Thus, percentage contribution of the sentence A is determined as 75%, i.e., 100%–25% (which is the percentage contribution of the sentence B). It should be noted that the non-limiting example explained above may not limit scope of present invention and may be valid for some embodiments. As will be appreciated, in other embodiment of the method and system, more than one log may predict to an issue and correlation may be calculated between lines and the sentences that compose those lines across all those logs that predict to the same issue.

At step 606, at least one sentence may be identified from the sentences, such that the percentage contribution of each of the at least one sentence may be greater than the predefined contribution threshold. In continuation of the example above, the predefined contribution threshold may be set as 50%. Thus, for the issue ID 1, the sentence A may be identified, since the percentage contribution of the sentence A is 75%.

Figure 7:
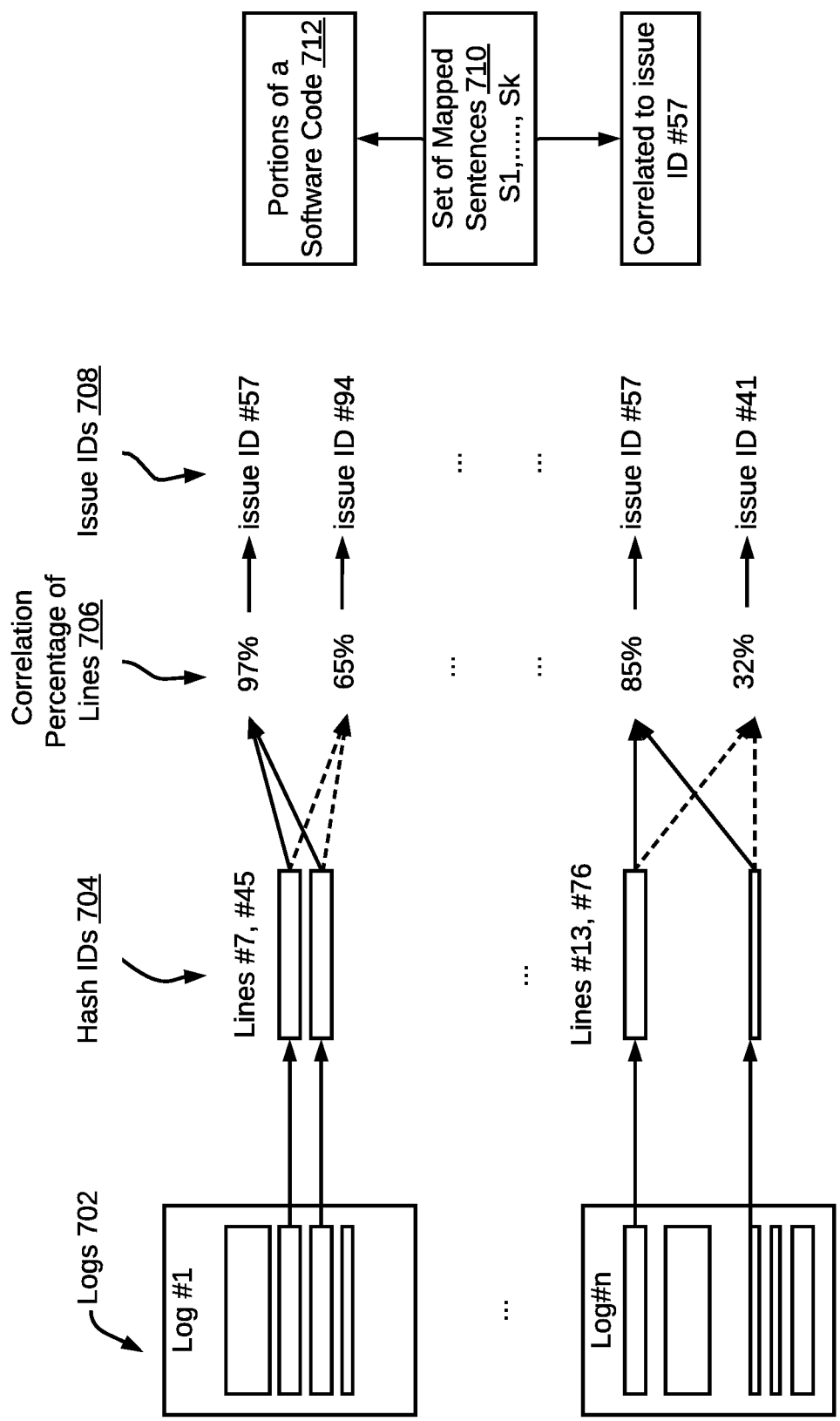
FIG. 7 illustrates identifying a set of mapped sentences for associated issue IDs, in accordance with an exemplary embodiment.

Referring now to FIG. 7, identifying a set of mapped sentences for associated issue IDs is illustrated, in accordance with an exemplary embodiment. In order to generate KPIs for a software, a plurality of logs 702 of the software may be retrieved, which may include Logs #1 to #n. A mapping database is generated by an ML Model, which includes hash ID for each line in a log and is further mapped to an issue ID. Hash IDs 704 for lines in the plurality of logs 702 and correlation percentage of lines 706 is depicted in FIG. 7. The correlation percentage of lines 706 may include the correlation percentage for each of the plurality of lines with respect to one or more issued IDs from a set of issue IDs 708.

As discussed before, this may further enable identification of a set of mapped lines for the issue ID. For an issue ID, the set of mapped lines may be identified, when the correlation percentage of each of the set of mapped lines with respect to the issue ID is greater than a predefined correlation threshold. This has already been explained in detail before in conjunction with FIG. 5. In this exemplary embodiment, the predefined correlation threshold may be set at 80%. Thus, in FIG. 7, for the issue ID 57, the set of mapped lines identified from the log #1 are lines #7 and #45, since, each of these lines have a correlation percentage of 97% with respect to the issue ID 57. In contrast, for the issue ID 94, the lines #7 and #45 have a correlation percentage of 65%, which is below 80%. Thus, the lines #7 and #45 are not mapped to the issued ID 94. Similarly, in the Log #n, lines #13 and #76 are mapped to the issue ID 57 and not to the issue ID 41.

Once the set of mapped lines are selected for an issue ID, the correlation frequency of each sentences in the set of mapped lines with the issue ID is determined in order to select a set of mapped sentences for the issue ID. For example, for the issue ID 57, sentences in the lines #7 and #45 from the log #1 and the lines #13 and #76 from the log #n may be evaluated for selection of a set of mapped sentences 710 for the issue ID 57. The method used to identify the set of mapped sentences 710 for the issue ID 57 has already been described in detail in conjunction with FIG. 6. The set of mapped sentences 710 may further map to one or more portions of a software code 712 of the software. This mapping between issue ID, mapped sentences, and portions of the software code 712 may further be used to generate a KPI for the issue ID 57.

By way of an example, for the issue ID 57, the set of mapped lines may be represented as given below:
Line 101—Connection to server has expired. Please, re-authenticate Line 34—Error 403: The server is refusing to authorize request #4021. Client certificate rejected.

Line 87—Client certificate has expired or is not yet valid.

Line 23—Failed to establish the VPN connection #293

Line 42—Client cannot reach the internet.

It should be noted that the each of the line 101 and the line 34 include two sentences each. In this example, a line 96 in a log of the software may map to a different issue ID. The line 96 may include two sentences as represented below:

Line 96—Error 403: The server is refusing to authorize request #931. Too many requests from the same client It may be noted that the first sentence of the line 96 is similar to the first sentence of the line 34 and thus their hash values would be same in the mapping database. In other words, though the first sentence of the lines 34 and 96 is same, they are mapped to different issue IDs. This indicates that, the line 34 got mapped to the issue ID 57, because of the second sentence of the line 34, i.e., "Client certificate rejected." Thus, the second sentence of the line 34 is mapped to the issue ID 57.

Based on the above determination of mapped lines and mapped sentences for the issue ID 57, a new KPI may be generated for the issue ID 57. The new KPI generated for the issue ID 57, may only trigger the log of lines 101, 34, 87, 23, 42 or a subset thereof. Additionally, the new KPI may rely on previously generated KPIs for related problems, if any. For example, if the issue ID 57 is related to an authentication issue and a connectivity issue, then the new KPI may be created by an appropriate merging of KPIs generated for related issues based on the set of mapped lines and the set of mapped sentences. It should be noted that, the new KPI may be represented as a new entry in software settings and may be enabled to toggle lines that correspond to authentication and connectivity related issues. As an example of this scenario, when the new KPI may be enabled, the log of the lines represented below by equation (6) (7) may be toggled in one go.

"Cannot Download File #123: Client cannot reach the internet and the VPN connection is down" (6)

"Cannot Download File #123: Connection to server has expired and client certificate seem to be expired" (7)

Figure 8:
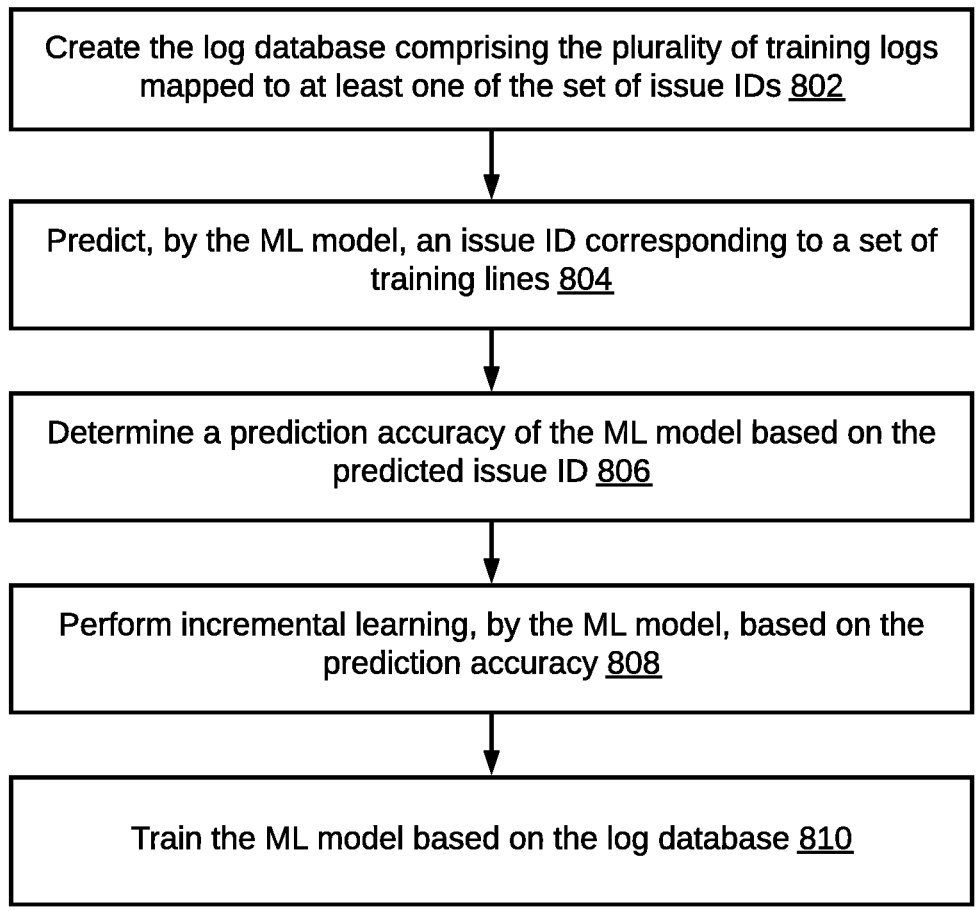
FIG. 8 is a flowchart of a method for training a Machine Learning (ML) model based on a log database to predict an issue ID for a set of lines, in accordance with an embodiment.

Referring now to FIG. 8, a flowchart of a method for training an ML model based on a log database to predict an issue ID for a set of lines is illustrated, in accordance with an embodiment. At step 802, the log database may be created. The log database may include a plurality of training logs mapped to one or more issue IDs from the set of issue IDs. Each of the plurality of training logs may include a set of training lines. Further, each of the set of training lines may include one or more training sentences mapped to one or more portions of a software code.

Thereafter, based on the log database, the ML model may be trained. In order to train the ML model, at step 804, the ML model may predict an issue ID corresponding to a set of training lines. The ML mode may predict an issue ID for each of the set of training lines. At step 806, a prediction accuracy of the ML model may be determined based on the predicted issue ID. The predication accuracy may either be determined by an administrator or based on a pre-existing mapping of the set of training lines to an issue ID. Based on the predicted accuracy, an incremental learning may be performed by the ML model at step 808. In other words, a feedback may be generated based on training performed for the ML model using the log database. The feedback generated may be used by the ML model as an input to perform incremental learning of the ML model.

Various embodiments provide method and system for generating KPIs for a software based on debugging information. The disclosed method and system may help to generate KPIs for a software based on debugging information. The disclosed method and system may also create a mapping of each of a plurality of lines in a log of the software to at least one issue ID from a set of issue IDs. Further, the system and method may generate a mapping database for the log based on the mapping. The system and method may then identify a set of mapped sentences for each of the set of issue IDs based on a set of mapped lines. The system and method may generate a KPI for each of the set of issue IDs based on the associated set of mapped sentences and the associated set of mapped lines.

The system and method provide some advantages like allowing data mining from software logs and exploiting connection between those software logs and codebase to automatically generate new KPIs. In addition, the new KPIs, once implemented in the product, may further help in diagnostics and monitoring of a software product environment. Further, as a result of the system and method, there may be no need of analysis and design required by developers to add new KPIs in a product code.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for generating Key Performance Indicators (KPIs) for a software based on debugging information, the method comprising:

creating, by a Machine Learning (ML) model, a mapping of each of a plurality of lines in a log of the software to at least one issue Identifier (ID) from a set of issue IDs, wherein each of the plurality of lines comprises at least one sentence, and wherein the ML model is trained based on a log database comprising a plurality of training logs mapped to at least one of the set of issue IDs;

generating, by the ML model, a mapping database for the log based on the mapping, wherein the mapping database comprises a hash ID for each of the plurality of lines mapped to the associated at least one issue ID, and wherein the hash ID for each line in the plurality of lines comprises hash values of the associated at least one sentence;

identifying, for each of the set of issue IDs, a set of mapped sentences based on a set of mapped lines, wherein the set of mapped lines is selected from the plurality of lines based on the mapping database; and generating, for each of the set of issue IDs, a KPI based on the associated set of mapped sentences and the associated set of mapped lines.

2. The method of claim 1, further comprising creating the log database comprising the plurality of training logs mapped to at least one of the set of issue IDs, wherein each of the plurality of training logs comprise a set of training lines and each of the set of training lines comprises at least one training sentence mapped to at least one portion of a software code, and wherein each of the set of issue IDs correspond to an issue.

3. The method of claim 2, further comprising training the ML model based on the log database, wherein training comprises:
predicting, by the ML model, an issue ID corresponding to the set of training lines;
determining a prediction accuracy of the ML model based on the predicted issue ID; and
performing incremental learning, by the ML model, based on the prediction accuracy.

4. The method of claim 1, wherein the hash ID for each line in the plurality of lines is a concatenation of hash values of the associated at least one sentence, and wherein the hash values are generated based on a predefined hashing function.

5. The method of claim 1, wherein identifying a set of mapped sentences for an issue ID based on a set of mapped lines mapped to the issue ID comprises:
identifying, for each of the plurality of lines, a number of mapped issue IDs;
computing a correlation percentage, for each of the plurality of lines, with respect to the issue ID, based on the number of mapped issue IDs; and
selecting the set of mapped lines for the issue ID from the plurality of lines, wherein the correlation percentage for the set of mapped lines is greater than a predefined correlation threshold.

6. The method of claim 5, further comprising:
determining, for each of the set of mapped lines, a correlation frequency of each of the associated sentences with the issue ID; and
selecting the set of mapped sentences from the associated sentences in each of the set of mapped lines, wherein the correlation frequency of the set of mapped sentences is greater than a predefined frequency threshold.

7. The method of claim 6, wherein determining a correlation frequency with the issue ID for each associated sentence in a mapped line from the set of mapped lines comprises:
extracting sentences from the mapped line;
determining a percentage contribution of each of the sentences for mapping the mapped line to the issue ID, based on the number of sentences in the mapped line and frequency of occurrence each of the sentences in a remaining plurality of lines not mapped to the issued ID; and
identifying at least one sentence from the sentences, wherein the percentage contribution of each of the at least one sentence is greater than a predefined contribution threshold.

8. The method of claim 1, wherein each sentence in the plurality of lines is a natural language sentence that maps to a portion of a software code for the software.

9. A system for generating Key Performance Indicators (KPIs) for a software based on debugging information, the system comprising:
a processor; and
a memory communicatively coupled to the processor, wherein the memory stores processor instructions, which, on execution, causes the processor to:
create a mapping of each of a plurality of lines in a log of the software to at least one issue Identifier (ID) from a set of issue IDs, wherein each of the plurality of lines comprises at least one sentence, and wherein the ML model is trained based on a log database comprising a plurality of training logs mapped to at least one of the set of issue IDs;
generate a mapping database for the log based on the mapping, wherein the mapping database comprises a hash ID for each of the plurality of lines mapped to the associated at least one issue ID, and wherein the hash ID for each line in the plurality of lines comprises hash values of the associated at least one sentence;
identify, for each of the set of issue IDs, a set of mapped sentences based on a set of mapped lines, wherein the set of mapped lines is selected from the plurality of lines based on the mapping database; and
generate, for each of the set of issue IDs, a KPI based on the associated set of mapped sentences and the associated set of mapped lines.

10. The system of claim 9, wherein the processor instructions further cause the processor to create the log database comprising the plurality of training logs mapped to at least one of the set of issue IDs, wherein each of the plurality of training logs comprise a set of training lines and each of the set of training lines comprises at least one training sentence mapped to at least one portion of a software code, and wherein each of the set of issue IDs correspond to an issue.

11. The system of claim 10, wherein the processor instructions further cause the processor to train the ML model based on the log database, and wherein training comprises:
predicting an issue ID corresponding to the set of training lines;
determining a prediction accuracy of the ML model based on the predicted issue ID; and
performing incremental learning based on the prediction accuracy.

12. The system of claim 9, wherein the hash ID for each line in the plurality of lines is a concatenation of hash values of the associated at least one sentence, and wherein the hash values are generated based on a predefined hashing function.

13. The system of claim 9, wherein the processor instructions further cause the processor to identify a set of mapped sentences for an issue ID based on a set of mapped lines mapped to the issue ID by:
identifying, for each of the plurality of lines, a number of mapped issue IDs;

computing a correlation percentage, for each of the plurality of lines, with respect to the issue ID, based on the number of mapped issue IDs; and selecting the set of mapped lines for the issue ID from the plurality of lines, wherein the correlation percentage for the set of mapped lines is greater than a predefined correlation threshold.

14. The system of claim 13, wherein the processor instructions further cause the processor to:

determine, for each of the set of mapped lines, a correlation frequency of each of the associated sentences with the issue ID; and select the set of mapped sentences from the associated sentences in each of the set of mapped lines, wherein the correlation frequency of the set of mapped sentences is greater than a predefined frequency threshold.

15. The system of claim 14, wherein the processor instructions further cause the processor to determine a correlation frequency with the issue ID for each associated sentence in a mapped line from the set of mapped lines by:

extracting sentences from the mapped line;

determining a percentage contribution of each of the sentences for mapping the mapped line to the issue ID, based on the number of sentences in the mapped line and frequency of occurrence each of the sentences in a remaining plurality of lines not mapped to the issued ID; and identifying at least one sentence from the sentences, wherein the percentage contribution of each of the at least one sentence is greater than a predefined contribution threshold.

16. The system of claim 9, wherein each sentence in the plurality of lines is a natural language sentence that maps to a portion of a software code for the software.

17. A non-transitory computer-readable medium storing computer-executable instructions for generating Key Performance Indicators (KPIs) for a software based on debugging information, the stored instructions, when executed by a processor, cause the processor to perform operations comprising:

creating, by a Machine Learning (ML) model, a mapping of each of a plurality of lines in a log of the software to at least one issue Identifier (ID) from a set of issue IDs, wherein each of the plurality of lines comprises at least one sentence, and wherein the ML model is trained based on a log database comprising a plurality of training logs mapped to at least one of the set of issue IDs;

generating, by the ML model, a mapping database for the log based on the mapping, wherein the mapping database comprises a hash ID for each of the plurality of lines mapped to the associated at least one issue ID, and wherein the hash ID for each line in the plurality of lines comprises hash values of the associated at least one sentence;

identifying, for each of the set of issue IDs, a set of mapped sentences based on a set of mapped lines, wherein the set of mapped lines is selected from the plurality of lines based on the mapping database; and generating, for each of the set of issue IDs, a KPI based on the associated set of mapped sentences and the associated set of mapped lines.

* * * * *